Patented June 27, 1950

2,513,103

UNITED STATES PATENT OFFICE 2,513,103

ISOMERIZATION OF HYDROCARBONS

Herbert J. Passino, Englewood, N. J., assignor to The M. W. Kellogg Company, Jersey City, N. J., a corporation of Delaware No Drawing. Application August 8, 1945, Serial No. 609,715

13 Claims. (Cl. 260—683.5)

This invention relates to the isomerization of hydrocarbons in the presence of a catalyst mixture of hydrogen fluoride and boron trifluoride, and is particularly applicable to the isomerization of normal and slightly branched paraffins.

The isomerization of straight-chain paraffin hydrocarbons to form branched-chain compounds, or isoparaffins, in the presence of a metal halide catalyst, or a mixture of such catalysts, is well known in the petroleum refining art. One of the more effective methods for such hydrocarbon conversion is to use hydrogen fluoride and boron trifluoride in varying proportions for simultaneous contact with the hydrocarbons undergoing isomerization treatment for a length of time sufficient to affect the degree of isomerization desired.

It has been found, however, that hydrogen fluoride-boron trifluoride catalysts have, in common with other previously discovered catalysts, a pronounced tendency to crack hydrocarbons as well as to rearrange them. This tendency towards cracking activity seems to increase in ascending order along the carbon chain. For example, n-heptane and n-octane appear to be considerably more susceptible to cracking than does n-butane. In like manner, the n-paraffins appear more susceptible to cracking from isomerizing catalysts then do their branched-chain isomers.

It is an object of this invention to provide an improved method for utilization of hydrogen fluoride-boron trifluoride catalysts in hydrocarbon conversion treatments whereby cracking of the hydrocarbons is reduced to a minimum.

A further object is to provide an improved process for catalytic isomerization of hydrocarbons in which suitable additives are used with hydrogen fluoride-boron trifluoride mixtures to effectively inhibit cracking of the hydrocarbons undergoing treatment.

The hydrocarbons susceptible of treatment in accordance with this invention include the paraffins, and particularly those paraffin hydrocarbons having four or more carbon atoms per molecule. For example, individual hydrocarbons, such as n-butane and n-heptane, may be treated to effect conversion to the corresponding isomers or narrow-boiling fractions. Also, the narrow-boiling, normally liquid fractions generally designated as "refinery hexanes" may be treated to increase the proportion of branched-chain hydrocarbons contained therein. In addition to the treatment of individual hydrocarbons or of narrow-boiling fractions, the process is applicable to the treatment of mixtures of hydrocarbons containing constituents which are subject to the desired reaction. These may include relatively wide-boiling fractions such as light or heavy naphtha and natural gasoline.

The catalytic material employed in the present process is a hydrogen fluoride-boron trifluoride mixture. While these constituents need not be present in the form of a physical mixture, it is preferred that they be at least available for simultaneous contact with the hydrocarbons undergoing the isomerization treatment, so that they function essentially as a single catalytic material. While the relative proportions of these constituents may vary within a considerable range, it is essential that the ratio of hydrogen fluoride to hydrocarbon reactants present in the reaction zone be relatively high. This constituent of the catalytic material should preferably be present in the reaction zone in an amount greater than 5% by weight of the hydrocarbon reactants present, and preferably in an amount equivalent to at least 10% by weight of the hydrocarbon reactants present. The ratio of boron trifluoride to the hydrocarbon reactants in contact with the hydrogen fluoride-boron trifluoride catalytic mixture also may vary within relatively wide limits, but preferably the boron trifluoride is present in amounts approximately equivalent to 0.5%–10% by weight of the hydrocarbon reactants.

In accordance with the present invention, the foregoing hydrocarbon conversion treatment is carried out in the presence of a suitable cracking inhibitor, the presence of which in small amounts is sufficient to appreciably decrease the amount of cracking. As a result, liquid product recovery is increased and the formation of butane and lighter fractions is decreased.

The conditions under which the hydrocarbon reactants and catalytic materials are contacted in the reaction zone will depend somewhat upon the cracking of the hydrocarbons undergoing treatment, and the temperatures necessary to effect the desired reaction. In the treatment of normally liquid hydrocarbons, it is usually desirable to maintain conditions within the reaction zone under which the catalytic materials and the hydrocarbon reactants are substantially in the liquid phase. In certain applications, however, it is contemplated that both the catalytic materials and the hydrocarbon reactants may more suitably be maintained in the vapor phase. It is further contemplated that in the treatment of certain hydrocarbons both liquid-phase and vapor-phase conditions may be desirable. For example, it may in a proper case be found advantageous to pass a vapor mixture comprising the hydrocarbon reactants and the boron trifluoride catalyst through a body of liquid hydrogen fluoride catalyst.

It has been found that small amounts of aromatics, naphthenes, and isoparaffins may successfully be employed as cracking inhibitors. Although the amount of additive may vary, depending upon the particular feed-stock and the proportions of hydrogen fluoride and boron trifluoride employed as a catalyst, satisfactory results have been obtained when the amount of additive was in the range of about 0.5% to 1%.

In order to illustrate the invention, specific examples of procedure are indicated by the following tables:

Table I

| Run Number | 1 | 2 | ¹3 | ¹4 | ²5 |
|---|---|---|---|---|---|
| Conditions: | | | | | |
| Temperature, °F | 150 | 200 | 150 | 175 | 200 |
| Reaction Pressure, p. s. i. | 450 | 800 | 525 | 410 | 500 |
| Time, Minutes | 60 | 60 | 60 | 60 | 60 |
| Charge: | | | | | |
| n-Pentane, gms | 380 | 400 | 400 | 400 | 400 |
| HF, gms | 100 | 100 | 100 | 100 | 100 |
| BF₃, gms | 100 | 115 | 115 | 90 | 90 |
| Yields: | | | | | |
| Liquid Product, Wt. Per Cent | 61 | 17 | 73 | 78 | 77 |
| Iso-Pentane in Liquid Product, Wt. Per Cent | 20 | ----- | 41 | 31 | 39 |

¹ 1% by weight of benzene added.
² 0.5% by weight of benzene added.

The initial runs, the conditions and results of which are indicated in Table I, were carried out on the use of inhibitors in the catalytic isomerization of n-pentane. Runs Nos. 1 and 2 in the foregoing table were control runs in which CP n-pentane was used as the feed. In Run No. 1 there was about a 60% liquid recovery, of which one third was isopentane. It will be noted that excessive cracking occurred in Run No. 2, wherein the temperature was increased to 200° F., and consequently a lower liquid recovery resulted, the comparative figures being 61% as against 17% by weight. Runs Nos. 3, 4, and 5 were carried out with a pentane feed to which had been added small amounts of benzene as a cracking inhibitor. In Run No. 3, 1% by weight of benzene was added to the pentane feed-stock. It will be noted from a comparison of Runs Nos. 1 and 3 that by the presence of 1% by weight of benzene in the feed, the liquid product recovered was materially increased and the conversion of n-pentane to isopentane was doubled. In Runs Nos. 4 and 5, temperatures slightly higher than that of Run No. 3 were employed without any substantial loss of liquid product recovered. Comparing Runs Nos. 2 and 5, in which the temperature and time conditions were substantially identical, it will be observed that the presence of 0.5% by weight of benzene in the feed stock resulted in a greatly increased recovery yield, in the order of 17% and 77%, respectively. The above-tabulated results show rather clearly that the addition of benzene as an inhibitor in amounts of 0.5% to 1% by weight greatly reduces cracking in the catalytic hydrocarbon conversion treatment of n-pentane employing a hydrogen fluoride-boron trifluoride mixture as a catalyst.

Table II

| Run Number | 1 | 2 | 3 | 4 | 5 | 6 | 7 | 8 |
|---|---|---|---|---|---|---|---|---|
| Additive—1% by Wt | ----- | (¹) | (¹) | (¹) | (²) | (²) | (²) | (³) |
| Conditions: | | | | | | | | |
| Temperature, °F | 150 | 150 | 200 | 250 | 150 | 200 | 150 | 150 |
| Pressure, p. s. i. reaction | 275 | 110 | 210 | 375 | 110 | 205 | 110 | 110 |
| Time, Minutes | 60 | 120 | 60 | 60 | 60 | 60 | 60 | 120 |
| Charge: | | | | | | | | |
| n-Heptane, gms | 405 | 400 | 390 | 397 | 410 | 422 | 414 | 421 |
| HF, gms | 100 | 85 | 100 | 100 | 100 | 100 | 100 | 100 |
| BF₃, gms | 25 | 25 | 25 | 25 | 25 | 25 | 25 | 30 |
| Yields: | | | | | | | | |
| Liquid Product, Wt. Per cent | 43 | 84 | 73 | 71 | 71 | 73 | 79 | 80 |
| Per cent C₄ and Lighter in Liquid Product | 32 | 2 | ----- | 11 | 11 | 16 | 18 | 19 |
| Inspections: | | | | | | | | |
| Gravity, °API | 69.6 | 71.7 | 83.2 | 77.9 | 73.9 | 79.2 | 78.4 | 78.3 |
| ASTM Distillation— | | | | | | | | |
| IBP, °F | 95 | 195 | 79 | 110 | 112 | 104 | 104 | 106 |
| 5% | 106 | 202 | 98 | 138 | 138 | 128 | 136 | 136 |
| 10% | 115 | 204 | 111 | 146 | 146 | 137 | 144 | 144 |
| 20% | 127 | 204 | 136 | 158 | 160 | 148 | 155 | 157 |
| 30% | 141 | 205 | 162 | 170 | 172 | 160 | 170 | 170 |
| 40% | 158 | 205 | 180 | 183 | 186 | 174 | 181 | 183 |
| 50% | 183 | 206 | 196 | 193 | 196 | 185 | 193 | 193 |
| 60% | 230 | 206 | 202 | 198 | 204 | 196 | 201 | 201 |
| 70% | 296 | 207 | 207 | 203 | 208 | 205 | 206 | 206 |
| 80% | 478 | 208 | 215 | 207 | 214 | 212 | 213 | 210 |
| 90% | 540 | 210 | ----- | 212 | 247 | 224 | 221 | 218 |
| 95% | ----- | 217 | ----- | 213 | 474 | 240 | 247 | 237 |
| EP | 552 | 481 | 345 | 282 | 488 | 292 | 298 | 288 |

¹ Benzene.
² Methylcyclohexane.
³ Isooctane.

In Table II are summarized the results of a series of eight runs carried out on the isomerization of n-heptane, both alone and in the presence of inhibitors. Run No. 1 was carried out using CP n-heptane as the charge or feed stock. From an observation of the figures denoting weight percent of liquid recovered, and the percent of C₄'s and lighter products in the liquid recovered, as well as the ASTM distillation data, it is clear that extensive cracking has occurred. In Run No. 2, using approximately the same reaction conditions, but adding 1% by weight of benzene to the charge as an inhibitor, the liquid recovered was approximately double and the amount of butane and lower boiling fractions in the liquid products was decreased by about 30%. The ASTM distillation also showed a much narrower boiling range product, which was a very good indication that the cracking reaction had been appreciably inhibited. Runs Nos. 3 and 4 were carried out using the same inhibitor, namely benzene, at slightly higher temperatures, the other reaction conditions remaining substantially constant. In both of these runs the liquid recovery yields were much higher than was the case in Run No. 1, and butane formation was much less. In fact, Run No. 4, made at a temperature 100° F. higher than that of Run No. 1, showed a liquid recovery nearly double that of Run No. 1, and a reduction of butane in the liquid recovered to the extent of ⅓ of that of Run No. 1. In Runs Nos. 5 and 6, 1% by weight of methylcyclohexane was used as the inhibitor, producing much the same results. In Runs No. 7 and 8 the temperatures were again lowered to 150° F. and 1% by weight of isooctane was used as an inhibitor. Here, again, the results were similar to those resulting from the use of benzene and methylcyclohexane as inhibitors, although it was noted that the liquid recovery yields were slightly higher and the production of butane was slightly increased.

Although I have described my invention in connection with the embodiments illustrated by the results summarized in Tables I and II, it is to be understood that it is not limited to the particular embodiments set forth. While the ranges and values specified are typical, various modifications may be made without departing from the spirit of my invention. For example, the invention contemplates a satisfactory temperature range of 100°–300° F. and a time range of 1–180 minutes in which to effect in its commercial application the desired degree of isomerization. In addition, the additives employed to inhibit cracking may be present in an amount of from 0.1%–5% by weight of the hydrocarbon reactant or reactants.

From the foregoing examples, it is apparent that I have provided a novel and effective method for inhibiting cracking in the isomerization of hydrocarbons in the presence of a hydrogen fluoride-boron trifluoride mixture. While I have illustrated my invention specifically in connection with the isomerization of n-butane and n-heptane, it is, of course, obvious that it is equally applicable to the isomerization of other hydrocarbons having four or more carbon atoms in the molecule, or a mixture of the same, without departing from the spirit of the invention, and it is desired therefore that only such limitations shall be placed thereon as are specifically set forth in the appended claims.

I claim:

1. The method for isomerizing aliphatic paraffin hydrocarbons having at least four carbon atoms per molecule which comprises contacting said hydrocarbons simultaneously with hydrogen fluoride and boron trifluoride in the presence of an added low boiling isoparaffin as a cracking inhibitor, the hydrogen fluoride being present in an amount equivalent to at least 10% by weight of the hydrocarbon reactants and the boron trifluoride being present in an amount equivalent to at least 0.5% by weight of the hydrocarbon reactants, and maintaining said contact for a time not exceeding about three hours and a temperature sufficient to effect the desired degree of isomerization.

2. The method for isomerizing aliphatic paraffin hydrocarbons having at least four carbon atoms per molecule which comprises contacting said hydrocarbons simultaneously with hydrogen fluoride and boron trifluoride in the presence of an added low boiling isoparaffin as a cracking inhibitor, the hydrogen fluoride being present in an amount equivalent to at least 10% by weight of the hydrocarbon reactants, the boron trifluoride being present in an amount equivalent to at least 0.5% by weight of the hydrocarbon reactants, and the inhibitor being present in an amount equivalent to from 0.1% to 5% by weight of the hydrocarbon reactants, and maintaining said contact at a temperature of 100°–300° F. for a period of from 1–180 minutes.

3. The method for isomerizing n-heptane which comprises contacting said n-heptane simultaneously with hydrogen fluoride and boron trifluoride in the presence of an added low boiling isoparaffin as a cracking inhibitor, the hydrogen fluoride being present in an amount equivalent to at least 10% by weight of the n-heptane reactant, the boron trifluoride being present in an amount equivalent to at least 0.5% by weight of the n-heptane reactant, and the inhibitor being present in an amount equivalent to from 0.1%–5% by weight of the n-heptane reactant, and maintaining said contact at a temperature of 100°–300° F. for a period of from 1–180 minutes.

4. The method for isomerizing n-pentane which comprises contacting said n-pentane simultaneously with hydrogen fluoride and boron trifluoride in the presence of an added low boiling isoparaffin as a cracking inhibitor, the hydrogen fluoride being present in an amount equivalent to at least 10% by weight of the n-pentane reactant, and the inhibitor being present in an amount equivalent to from 0.1% to 5% by weight of the n-pentane reactant, and maintaining said contact at a temperature of 100°–300° F. for a period of from 1–180 minutes.

5. A process for converting normal heptane to an isoheptane with a minimum of conversion to other paraffin hydrocarbons, which comprises admixing with normal heptane a low-boiling isoparaffin hydrocarbon in an amount between about 0.5 and about 5 per cent by weight of the total hydrocarbons, subjecting the resulting admixture to reaction at a temperature between about 100 and about 300° F. in the presence of a liquid catalyst consisting of hydrofluoric acid and boron trifluoride, the boron trifluoride being present in the catalyst in minor amount for a reaction time not exceeding about three hours to isomerize said normal heptane, and recovering from effluents of said reaction a hydrocarbon fraction containing an isoheptane so produced.

6. An improved process for isomerizing a paraffin hydrocarbon having at least four carbon atoms per molecule, which comprises admixing with said paraffin hydrocarbon a minor amount of a low boiling isoparaffin hydrocarbon, subjecting the resulting admixture to reaction under isomerization conditions in the presence of a liquid catalyst consisting of hydrofluoric acid and boron trifluoride, the boron trifluoride being present in the catalyst in a minor amount, maintaining a contact time not exceeding about three hours and a temperature sufficient to effect the desired degree of isomerization, and recovering from effluents of said reaction a hydrocarbon fraction containing an isomer of said paraffin hydrocarbon so produced.

7. An improved process for isomerizing a paraffin hydrocarbon having at least four carbon atoms per molecule which comprises admixing with said paraffin hydrocarbon a minor amount of a low boiling isoparaffin, subjecting the resulting admixture to reaction under isomerization conditions in the presence of a catalyst consisting essentially of hydrofluoric acid and boron trifluoride, maintaining a contact time not exceeding about three hours and a temperature between about 100 and about 300° F., and recovering from effluents of said reaction a hydrocarbon fraction containing an isomer of said paraffin hydrocarbon so produced.

8. The process of claim 7 in which said paraffin hydrocarbon is normal butane.

9. The process of claim 7 in which said paraffin hydrocarbon is normal pentane.

10. The process of claim 7 in which said paraffin hydrocarbon is normal heptane.

11. The process for effecting the isomerization of a low boiling paraffin hydrocarbon while inhibiting cracking conversion which comprises contacting such a hydrocarbon simultaneously with hydrogen fluoride and boron trifluoride in the presence of an added isoparaffin which is present in an amount sufficient substantially to inhibit said cracking, maintaining a contact time not exceeding about three hours and a temperature sufficient to effect the desired degree of isomerization, and recovering from the effluent of said isomerization a hydrocarbon fraction containing an isomeric paraffin so produced.

12. An improved process for isomerizing a paraffin hydrocarbon having at least four carbon atoms per molecule which comprises admixing with said paraffin hydrocarbon a minor amount of isooctane, subjecting the resulting admixture to reaction under isomerization conditions in the presence of a liquid catalyst consisting of hydrofluoric acid and boron trifluoride, the boron trifluoride being present in the catalyst in a minor amount, and recovering from effluents of said reaction a hydrocarbon fraction containing an isomer of said paraffin hydrocarbon so produced.

13. The process for effecting the isomerization of a low boiling paraffin hydrocarbon which comprises contacting such a hydrocarbon simultaneously with hydrogen fluoride and boron trifluoride in the presence of a minor amount of added iso-octane, under conditions such that the desired degree of isomerization is effected, and recovering from the effluent of said isomerization a hydrocarbon fraction containing an isomer of said paraffin.

HERBERT J. PASSINO.

REFERENCES CITED

The following references are of record in the file of this patent:

UNITED STATES PATENTS

| Number | Name | Date |
| --- | --- | --- |
| 2,250,118 | Smithuysen | July 22, 1941 |
| 2,322,664 | Russell | June 22, 1943 |
| 2,325,122 | Ipatieff et al. | July 27, 1943 |
| 2,355,198 | Atwell | Aug. 8, 1944 |
| 2,357,495 | Bloch | Sept. 5, 1944 |
| 2,408,752 | Burk | Oct. 8, 1946 |

FOREIGN PATENTS

| Number | Country | Date |
| --- | --- | --- |
| 24,044 | India | May 25, 1937 |